United States Patent
Geier (10) Patent No.: US 12,330,428 B2
(45) Date of Patent: Jun. 17, 2025

(54) PRINTING CARTRIDGE CAPABLE OF CONTROLLING AND TRACKING 3D PRINTING MATERIAL

(71) Applicant: BIOMET 3i, LLC, Palm Beach Gardens, FL (US)

(72) Inventor: Andreas Geier, Gargazon (IT)

(73) Assignee: Biomet 3i, LLC, Palm Beach Gardens, FL (US)

( * ) Notice: Subject to any disclaimer, the term of this patent is extended or adjusted under 35 U.S.C. 154(b) by 5 days.

(21) Appl. No.: 18/091,121

(22) Filed: Dec. 29, 2022

(65) Prior Publication Data

US 2023/0211615 A1    Jul. 6, 2023

Related U.S. Application Data

(60) Provisional application No. 63/295,771, filed on Dec. 31, 2021.

(51) Int. Cl.
*B41J 2/175*        (2006.01)

(52) U.S. Cl.
CPC ............................. *B41J 2/17596* (2013.01)

(58) Field of Classification Search
CPC ..... B41J 2/17566; B41J 2/17596; B41J 2/175; B41J 2/17503
See application file for complete search history.

(56) References Cited

U.S. PATENT DOCUMENTS

2009/0160918 A1* 6/2009 Sugahara ............. B41J 2/17513
                                                              347/86
2020/0238618 A1* 7/2020 John ..................... B29C 64/321

OTHER PUBLICATIONS

Extended European Search Report for European Patent Application No. 22217117.5, dated Apr. 21, 2023 8 pages.
Official Action for European Patent Application No. 22217117.5, dated Jul. 10, 2023 2 pages.

* cited by examiner

*Primary Examiner* — Jason S Uhlenhake
(74) *Attorney, Agent, or Firm* — Sheridan Ross P.C.

(57) ABSTRACT

A printing cartridge capable of controlling and tracking 3D printing material. The printing cartridge having an open configuration and a closed configuration.

20 Claims, 10 Drawing Sheets

PRINTING CARTRIDGE CAPABLE OF CONTROLLING AND TRACKING 3D PRINTING MATERIAL

CROSS-REFERENCE TO RELATED APPLICATION

This application claims the benefit of U.S. Provisional Application No. 63/295,771, filed on Dec. 31, 2021, which is incorporated herein by reference in its entirety.

TECHNICAL FIELD

The invention relates to a printing cartridge capable of controlling and tracking 3D printing material.

BACKGROUND

Printing material is comparatively expensive. Therefore, efforts have been made to use up the amount of printing material in the bottle as completely as possible as well as not wasting the printing material. The printing material from the bottle is therefore introduced into a trough or a tub, which provides some storage capacity for the liquid printing material. For stereolithography, however, a certain filling level of the tub is indispensable to enable slicing. For example, the construction platform must be submersible in the printing material and movable in the Z-direction during slicing.

Rapid prototyping processes are used increasingly to produce components quickly and with high precision based on CAD/CAM data. The stereolithography process which is particularly used in the field of dental technology, and which may be used further stands out from known processes. In a way known per se, the respective component is built up in layers from a liquid, the print material, by exposing certain structures.

SUMMARY

In one aspect, the present invention provides a printing cartridge capable of controlling and tracking 3D printing material.

These and other examples, advantages, and features of the present dental membranes will be set forth in part in the following Detailed Description and the accompanying drawings. This Overview is intended to provide non-limiting examples of the present subject matter—it is not intended to provide an exclusive or exhaustive explanation. The Detailed Description and drawings are included to provide further information about the present porous metal dental implants.

BRIEF DESCRIPTION OF THE DRAWINGS

The above-mentioned and other features and advantages of this disclosure, and the manner of attaining them, will become more apparent and will be better understood by reference to the following description of embodiments of the disclosure taken in conjunction with the accompanying drawings.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
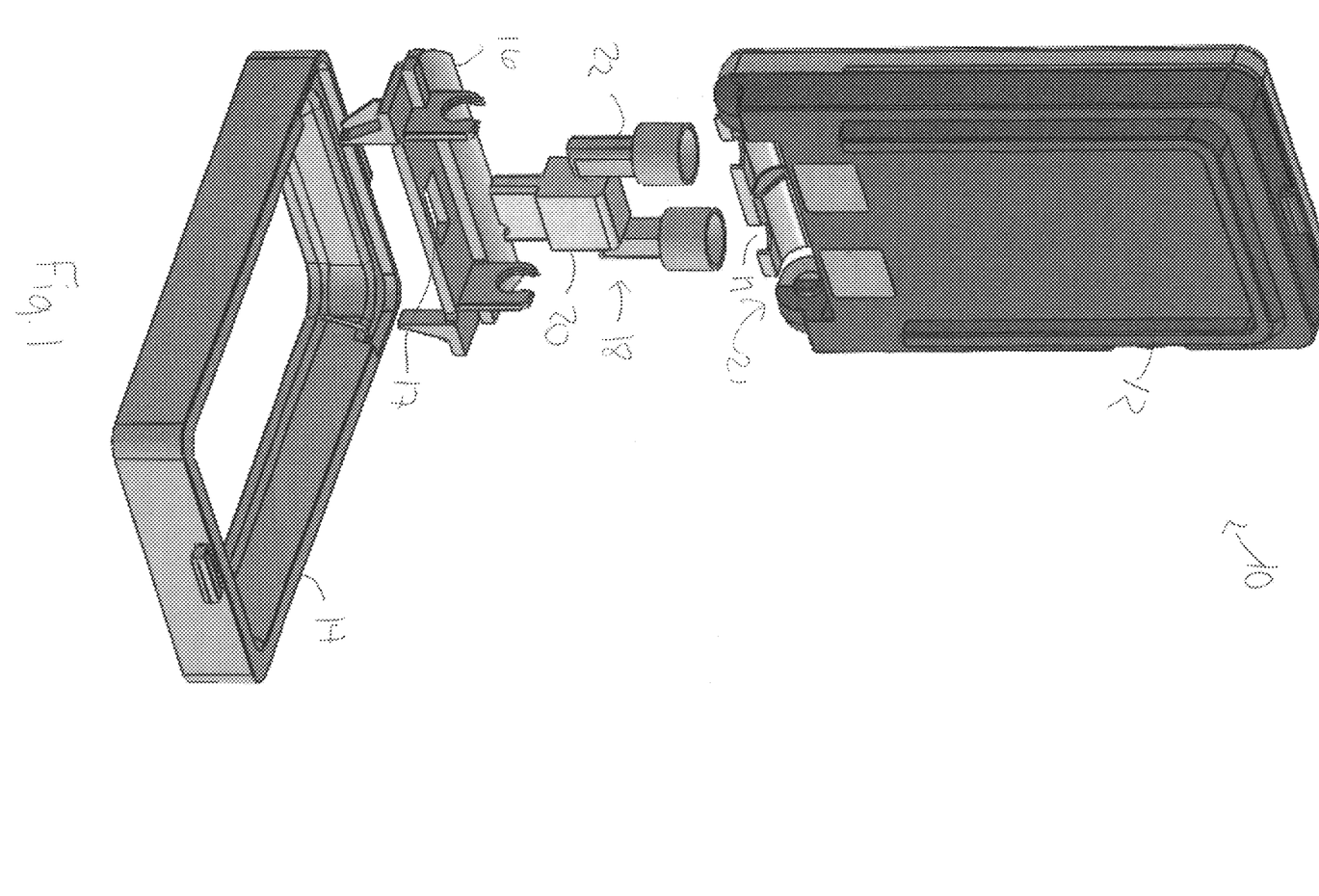
FIG. 1 illustrates an expanded view of a printing cartridge, accordance with at least one example of the present disclosure.
Figure 2:
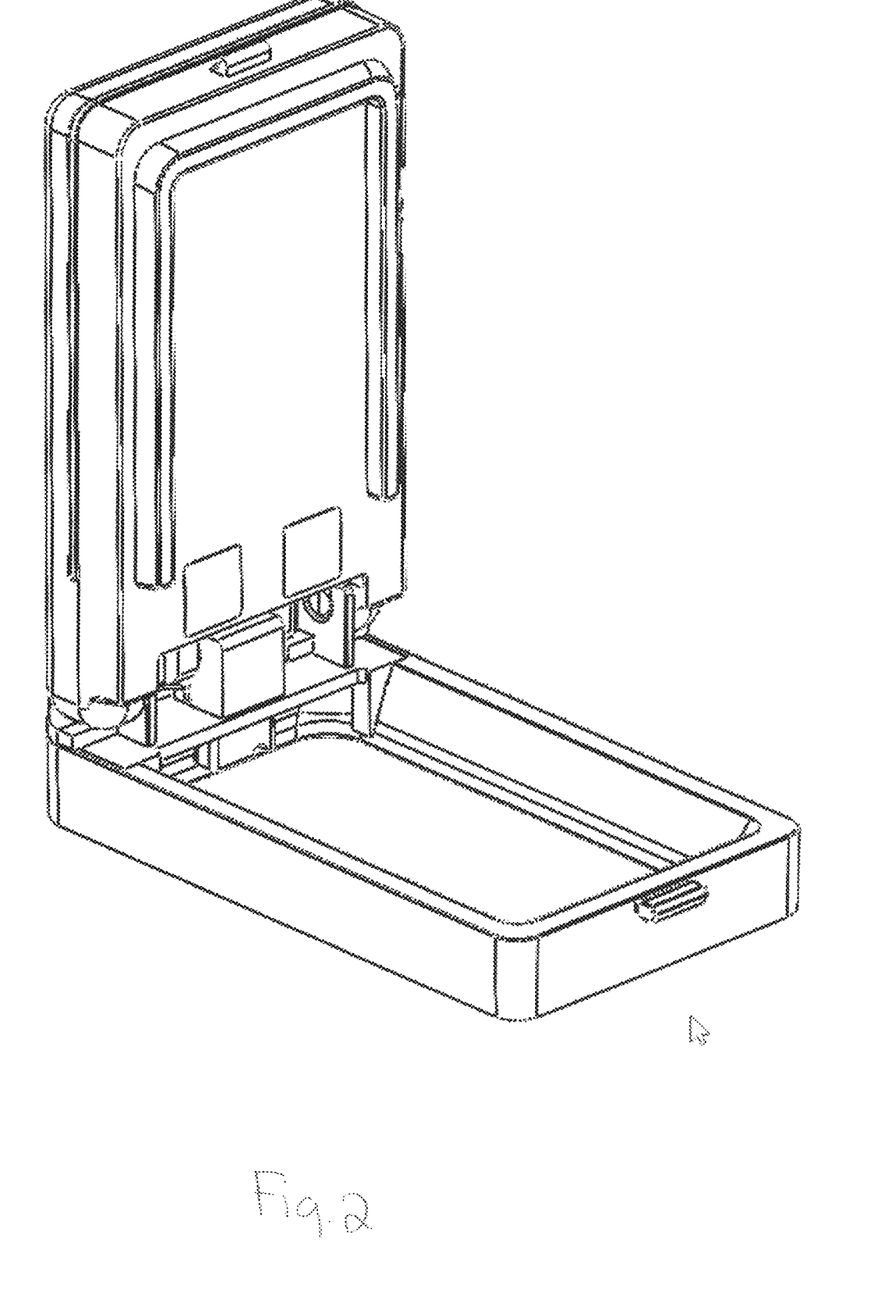
FIG. 2 illustrates an assembled view of the printing cartridge in FIG. 1.

The invention relates to a printing cartridge capable of controlling and tracking 3D printing material. FIG. 1 illustrates an expanded view of a printing cartridge 10 including a bottle 12, a trough 14, a coupling base 16, and a control device 18 including a base 20 and a pair of rotatable arms 22. FIG. 2 illustrates an assembled view of the printing cartridge 10.

Figure 3:
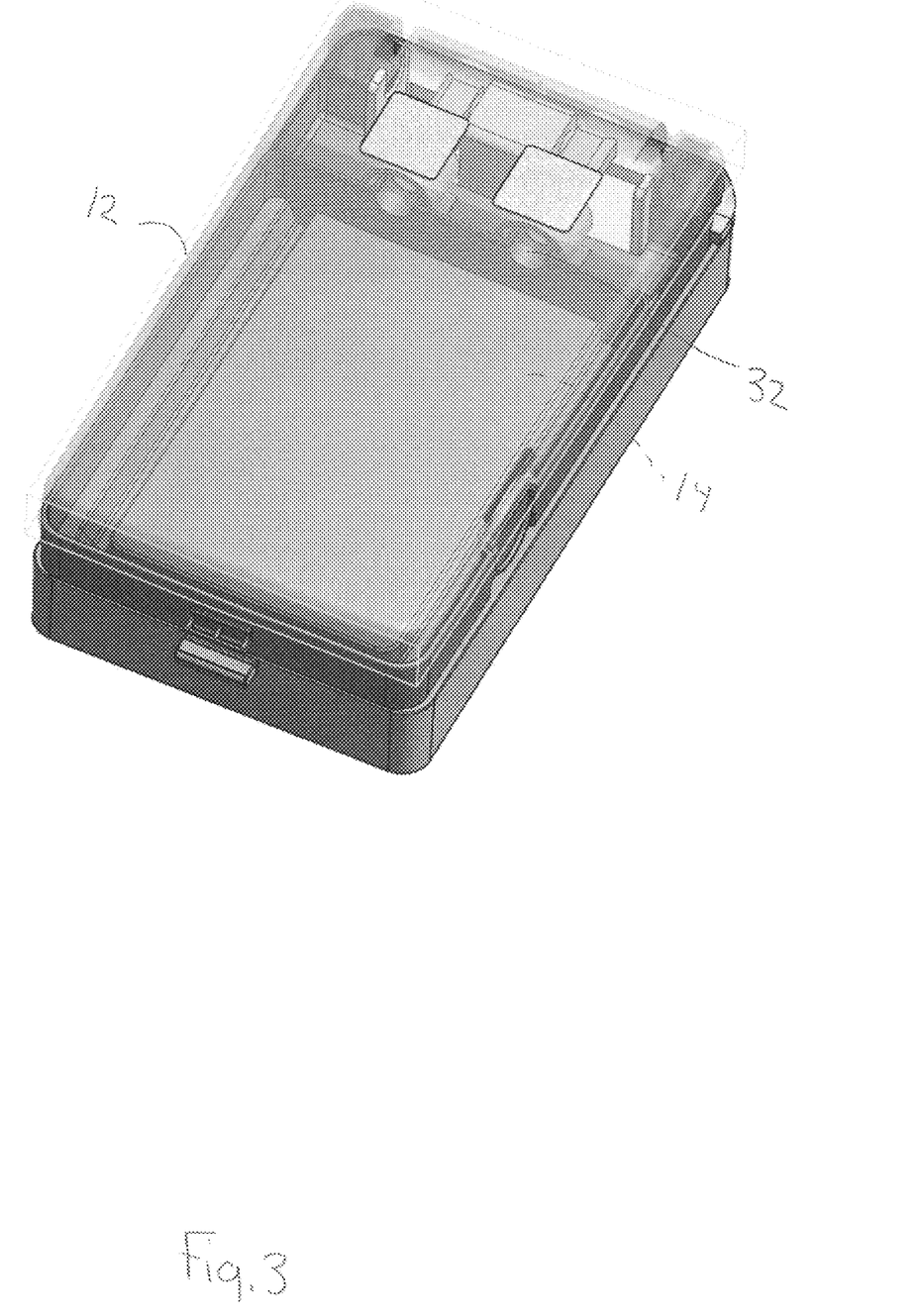
FIG. 3 illustrates a partially transparent view of the printing cartridge, accordance with at least one example of the present disclosure.
Figure 4:
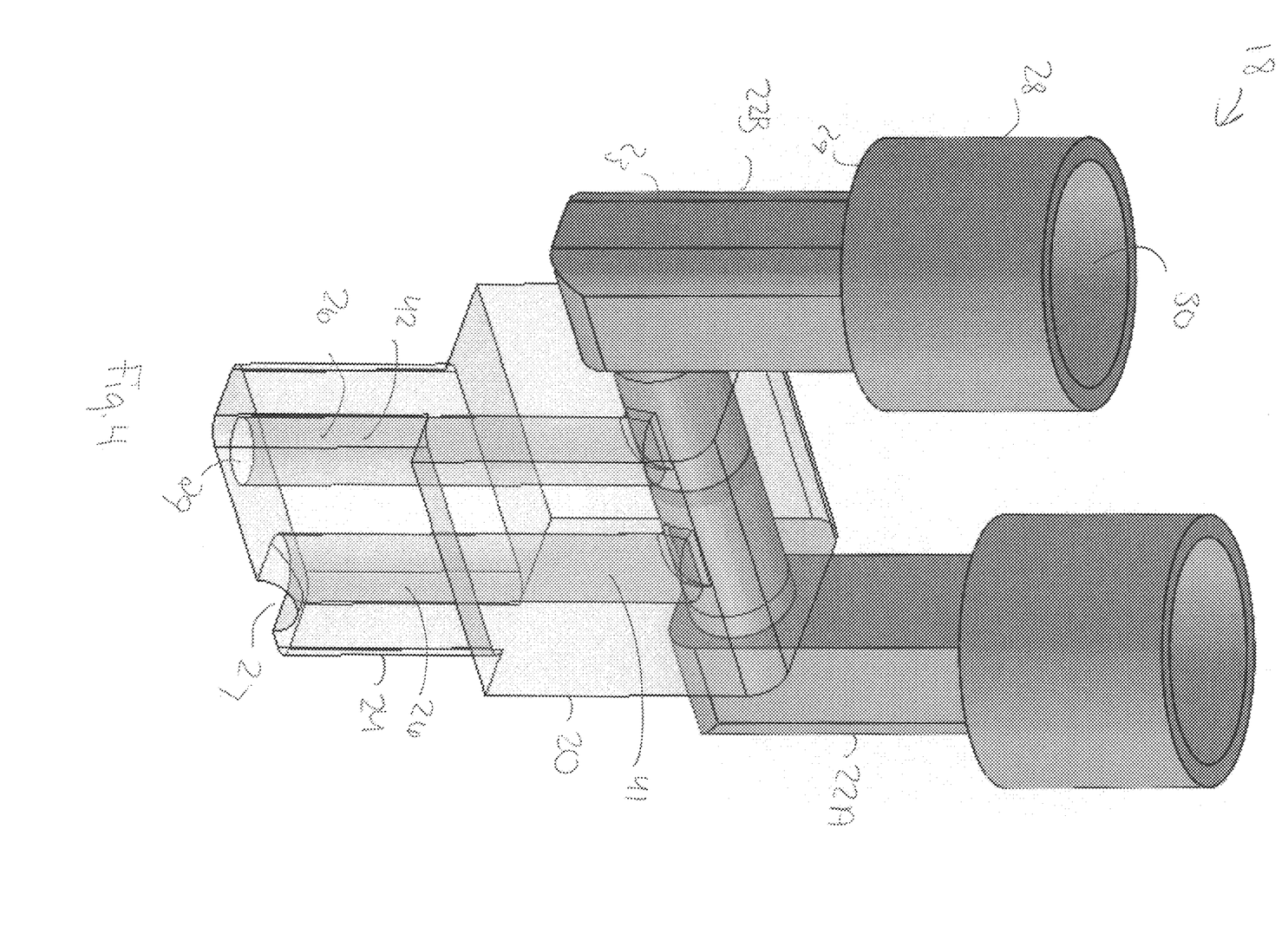
FIG. 4 illustrates a partially transparent view of a control device, in accordance with at least one example of the present disclosure.
Figure 5:
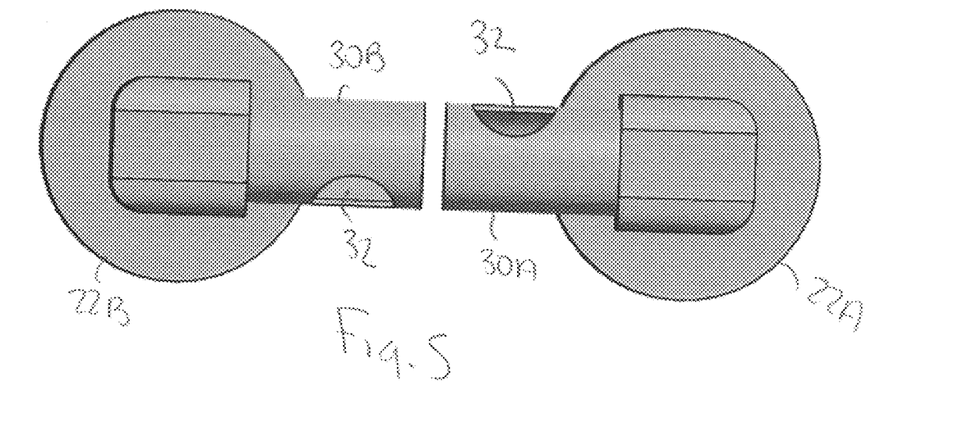
FIG. 5 illustrates a bottom view of a portion of the control device, accordance with at least one example of the present disclosure.
Figure 6:
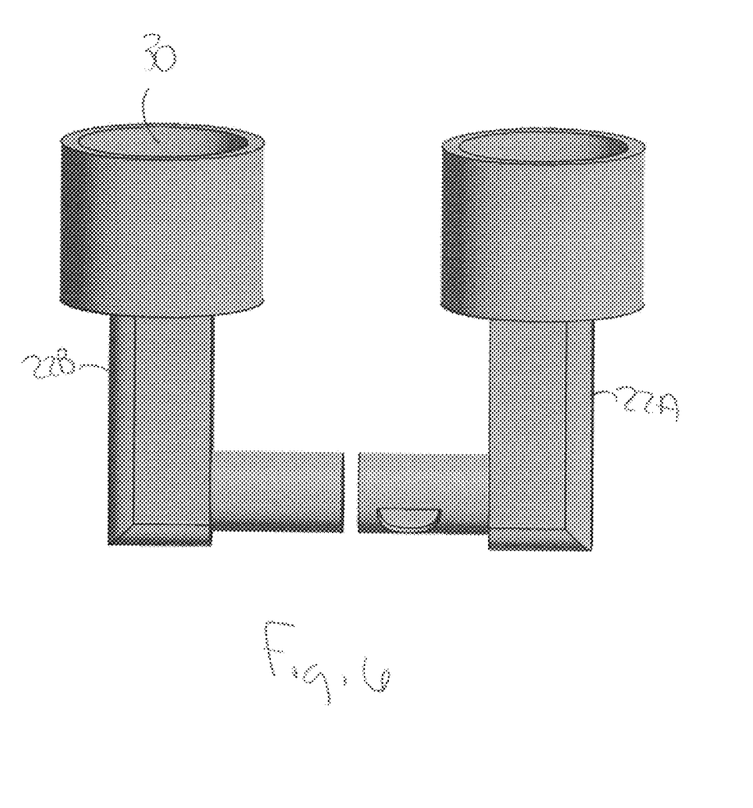
FIG. 6 illustrates a side view of a portion of the control device, accordance with at least one example of the present disclosure.

As seen in FIG. 3, the bottle 12 includes a cavity 14 configured to receive printing material (not shown). The coupling base 16 is configured to be coupled to the trough 14, the bottle 12, and the control device 18. For example, a portion of the control device 18 can be received within an opening 17 of the coupling base. The arms 22 are configured to be coupled to the bottle 12 such that rotating the bottle 12 rotates the arms 22 within the base 20. That is the arms 22 are rotatable relative to the base 20. As seen in FIG. 4, the arms 22 can receive a portion of a projection 32 that is in fluid communication with the cavity 14.

Referring to FIG. 4, the arms 22 include a shaft 23 and an annular projection 28. The shaft 23 is received within coupling grooves 17 of an attachment portion 19 of the bottle 12. The coupling grooves 17 receive the shaft 23 and a shoulder of the annular projection 28 prevents the bottle 10 remove being lifted off accidentally from the coupling base 20.

Figure 7:
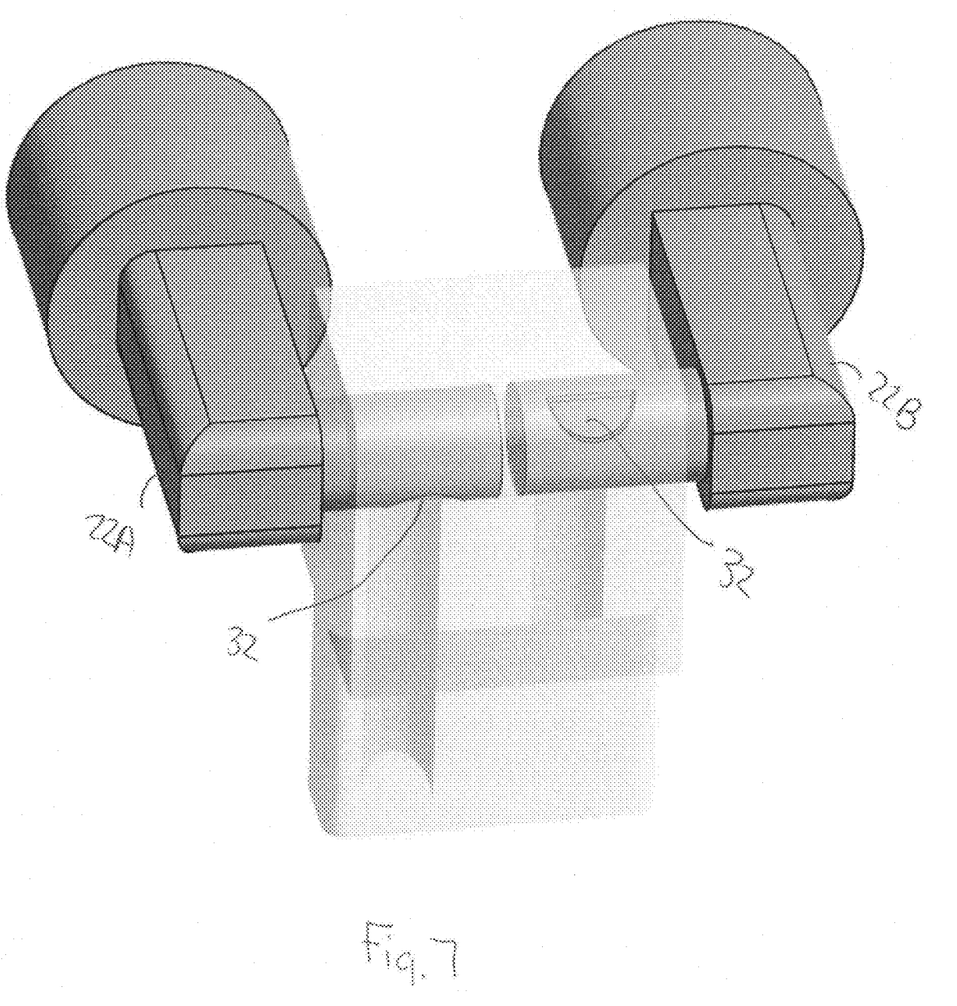
FIG. 7 illustrates a partially transparent view of a control device, in accordance with at least one example of the present disclosure.
Figure 8:
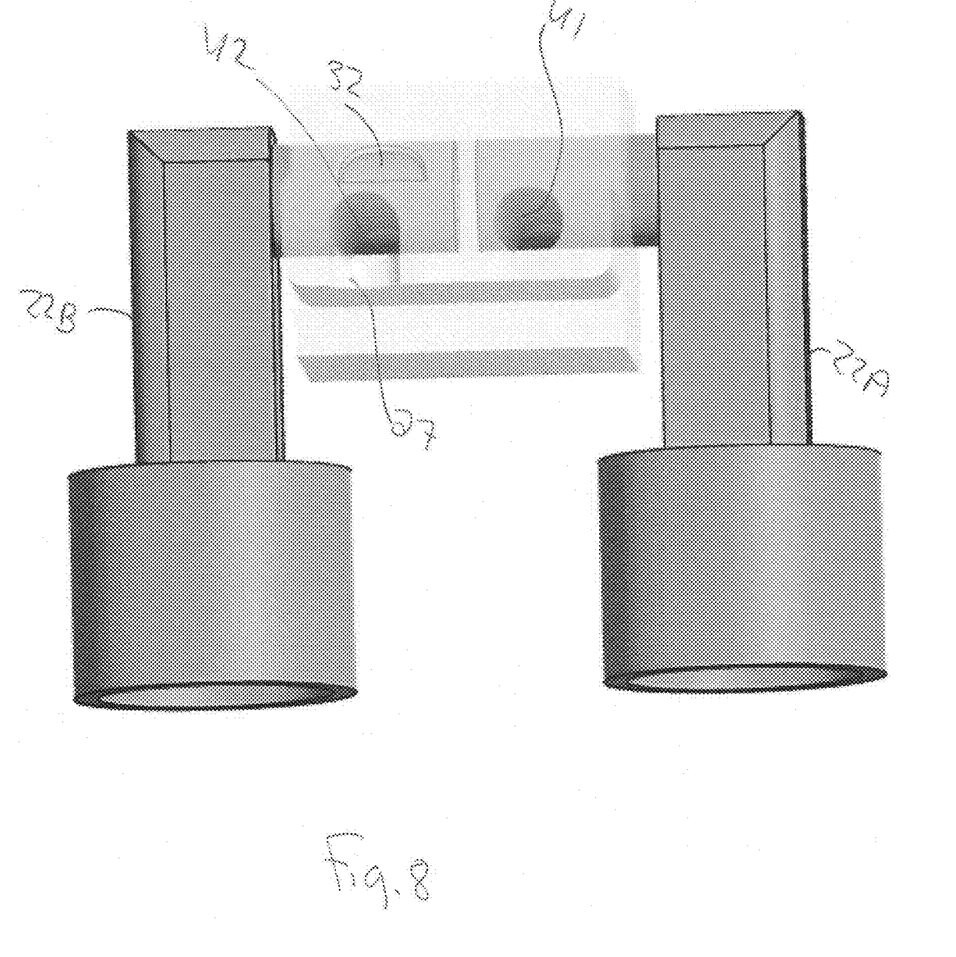
FIG. 8 illustrates a top view of the device shown in FIG. 7.

The arms 22 are L-shaped and define a lumen 30. Lumen 30 of a firm arm is in fluid communication with the lumen 30 of the other arm 22. A first arm 22A and a second arm 22B are coupled to the base 20. A portion 30A and 30B of the arms 22A, 22B are into a bore 40 extending from a first side surface to a second side surface. The lumen 30 in the arms 22A, 22B, extend along the entire portion of the arm 22A and 22B. Each arm includes a side opening 32 that can be selectively in fluid communication with bores 41 and 42 that extend from the bore 40 to an opening. As seen in FIG. 4, bore 41 in fluid communication with arm 22A extends from bore 40 to a side opening 27 that is in fluid communication with the trough 14 and delivers the printing material to the trough 14. The bore 42 in fluid communication with arm 22B extends from bore 40 to a bottom opening 29. As discussed herein, the printing cartridge has an open configured (seen in FIG. 4) and a closed configuration (seen in FIGS. 7 and 8).

Figure 9:
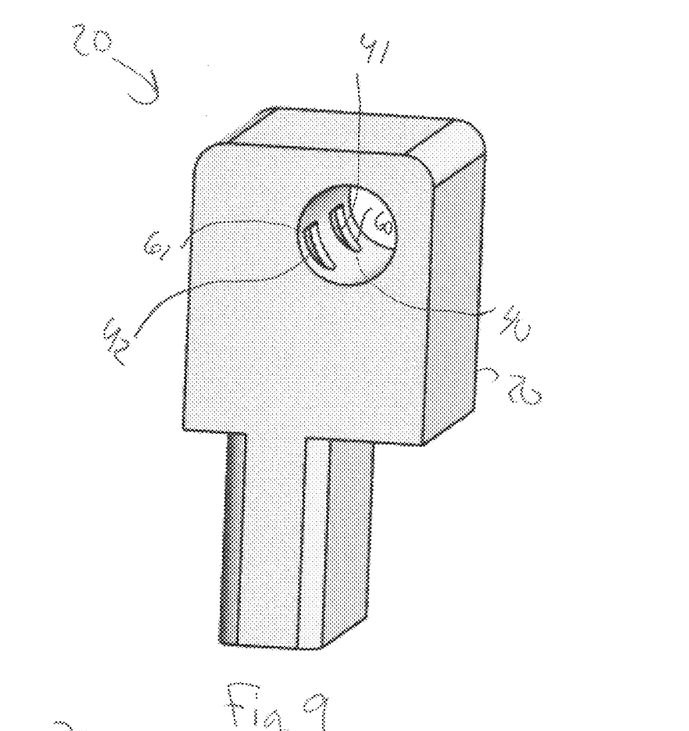
FIG. 9 illustrates a perspective view of the base of the control device, in accordance with at least one example of the present disclosure.
Figure 10:
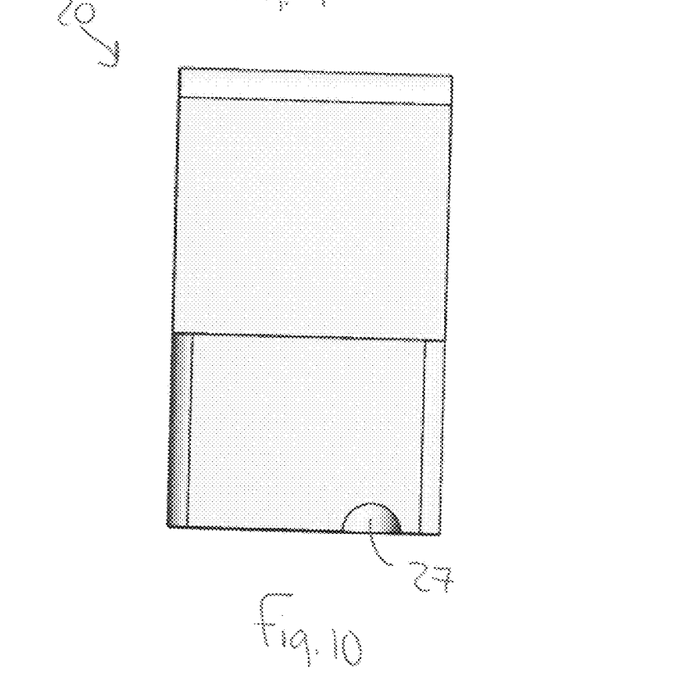
FIG. 10 illustrates a side view of the base of the control device, in accordance with at least one example of the present disclosure.
Figure 11:
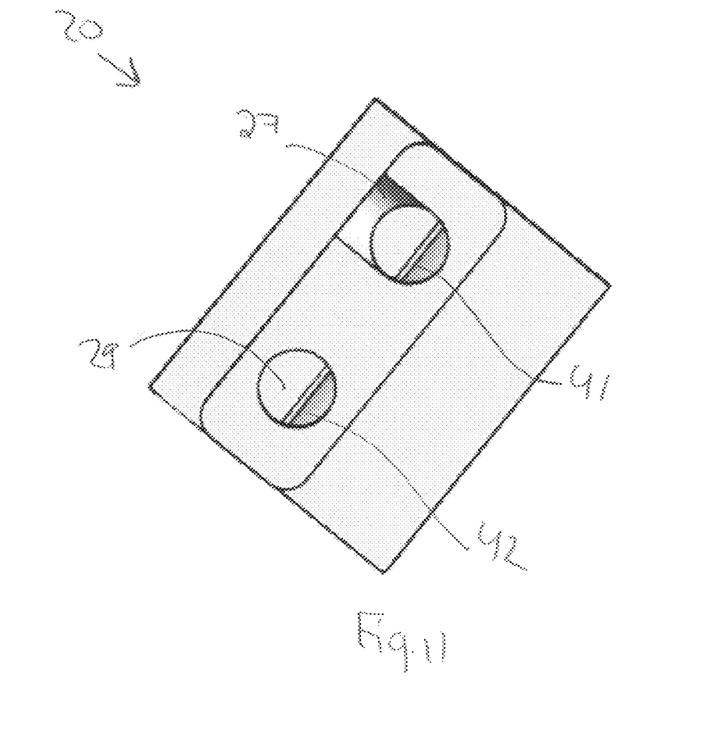
FIG. 11 illustrates a bottom view of the base of the control device, in accordance with at least one example of the present disclosure.

FIGS. 9-11 illustrate the base 20. The base 20 includes bores 41 and 42 that extend from a first opening along a wall of the bore 40 to an opening. The bore 42 extends from opening 60 to side opening 27. The bore 41 extends from opening 61 to opening 29 along a bottom surface. When the cartridge 10 is in the open configuration, the printing material extends through opening 27 into the trough. The opening 60 is in fluid communication with the opening 32 of the arm 22A. The opening 61 can be in partial fluid communication with the opening 32 on the arm 22A to allow air circulation when the printing material is being released into the trough 14. When the printing cartridge 10 is in the closed configuration, neither opening 32 is in communication with openings 60 or 61.

This configuration allows for precise delivery of the printing material such that the amount of material wasted is reduced.

Figure 12:
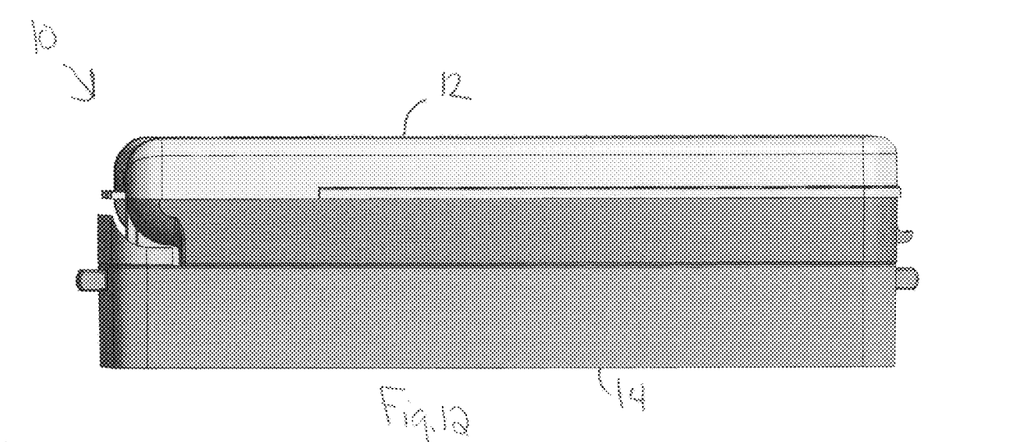
FIG. 12 illustrates a side view of the printing cartridge, in accordance with at least one example of the present disclosure.
Figure 13:
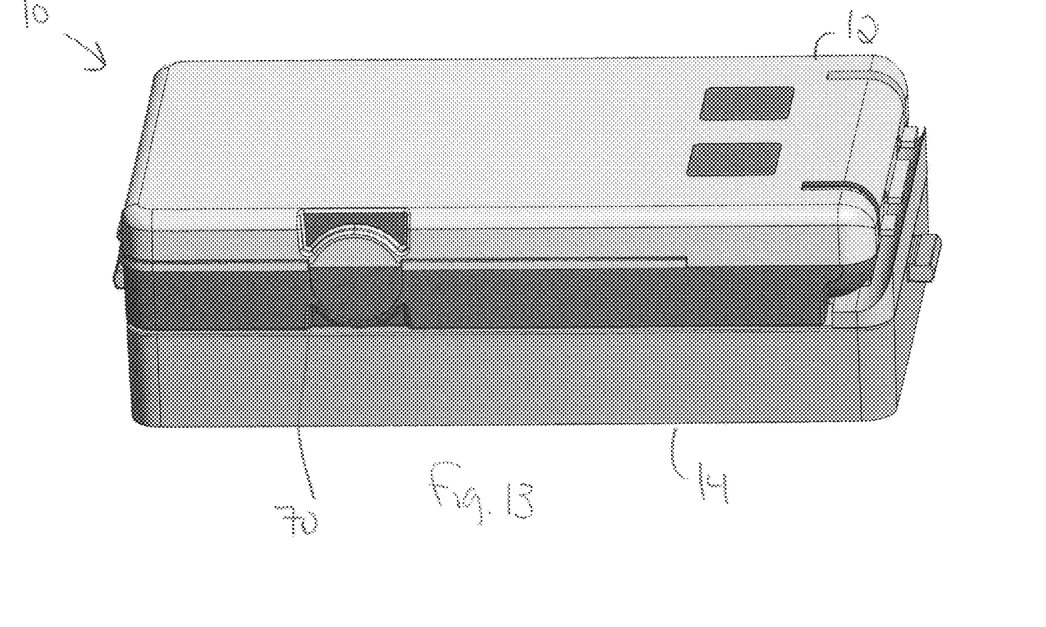
FIG. 13 illustrates a side view of the printing cartridge, in accordance with at least one example of the present disclosure.

FIGS. 12 and 13 illustrates side views of the cartridge 10. As seen in FIG. 13, the bottle 12 includes an RFID tag 70 to monitor the level of printing material remaining in the bottle. The RFID tag 70 consists of a small memory, the mini memory device, and a mini antenna, which is for communication to the outside world, as well as a control electronics. RFID tags themselves are known. The control electronics may be, but are not limited to, a CPU, embedded controller, ASIC, and the like.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A printing cartridge for delivering printing material, the printing cartridge comprising:
   a material cartridge which is configured to hold printing material;
   a trough configured to receive the printing material; and
   a control valve device configured to transition between an open configuration and a closed configuration, wherein in the open configuration an outlet opening received at least partially in the trough is in fluid communication with a cavity of the material cartridge such that the printing material may be output into the trough, wherein the control valve device comprises:
   a base;
   a first arm rotatable relative to the base, wherein the first arm includes a first shaft comprising a first lumen and a first portion that extends into the base along an axis of rotation, wherein the first arm comprises a first side opening on the first portion that extends into the base; and
   a second arm rotatable relative to the base, wherein the second arm includes a second shaft comprising a second lumen and a second portion that extends into the base along the axis of rotation, and wherein the second arm comprises a second side opening on the second portion that extends into the base.

2. The printing cartridge of claim 1, further comprising: a bottle.

3. The printing cartridge of claim 2, further comprising: an RFID tag to monitor a level of the printing material remaining in the bottle.

4. The printing cartridge of claim 3, wherein the RFID tag comprises memory and an antenna.

5. The printing cartridge of claim 4, wherein the RFID tag comprises control electronics.

6. The printing cartridge of claim 2, wherein the bottle includes a cavity configured to receive the printing material.

7. The printing cartridge of claim 2, further comprising:
a coupling base configured to be coupled to the trough and the control valve device.

8. The printing cartridge of claim 7, wherein a portion of the control valve device is received within an opening of the coupling base.

9. The printing cartridge of claim 7, wherein the base comprises a bore aligned with the axis of rotation, wherein the bore aligned with the axis of rotation receives the first portion of the first arm and the second portion of the second arm.

10. The printing cartridge of claim 9, wherein the base further comprises a first opening and a second opening in the bore aligned with the axis of rotation, wherein the first opening aligns with the first side opening of the first arm when the control valve device is in a first open configuration, and wherein the second opening aligns with the second side opening of the second arm when the control valve device is in a second open configuration.

11. The printing cartridge of claim 1, wherein the first lumen of the first arm and the second lumen of the second arm are in fluid communication with one another.

12. The printing cartridge of claim 1, wherein the first arm comprises a first annular projection, wherein the second arm comprises a second annular projection, and wherein the first and second annular projections each comprise a shoulder.

13. The printing cartridge of claim 1, wherein the first side opening is provided on a different side of the first portion than a side of the second portion on which the second side opening is provided.

14. A system, comprising:
a printing cartridge configured to hold printing material and deliver the printing material to a trough via a control valve device depending upon a position of the control valve device, wherein the control valve device is configured to transition between an open configuration and a closed configuration, wherein in the open configuration an outlet opening received at least partially in the trough enables the printing material to be output into the trough, wherein the control valve device comprises:
a base;
a first arm rotatable relative to the base, wherein the first arm includes a first shaft comprising a first lumen and a first portion that extends into the base along an axis of rotation, wherein the first arm comprises a first side opening on the first portion that extends into the base; and
a second arm rotatable relative to the base, wherein the second arm includes a second shaft comprising a second lumen and a second portion that extends into the base along the axis of rotation, and wherein the second arm comprises a second side opening on the second portion that extends into the base.

15. The system of claim 14, further comprising:
a bottle.

16. The system of claim 15, further comprising:
an RFID tag to monitor a level of the printing material remaining in the bottle.

17. The system of claim 16, wherein the RFID tag comprises memory and an antenna.

18. The system of claim 17, wherein the RFID tag comprises control electronics.

19. The system of claim 15, wherein the bottle includes a cavity configured to receive the printing material.

20. A method, comprising:
holding printing material in a material cartridge;
enabling a control valve device to transition from a closed configuration to an open configuration thereby fluidically aligning an outlet of a trough with a cavity of the material cartridge such that the printing material passes from the material cartridge into the trough, wherein the control valve device comprises:
a base;
a first arm rotatable relative to the base, wherein the first arm includes a first shaft comprising a first lumen and a first portion that extends into the base along an axis of rotation, wherein the first arm comprises a first side opening on the first portion that extends into the base; and
a second arm rotatable relative to the base, wherein the second arm includes a second shaft comprising a second lumen and a second portion that extends into the base along the axis of rotation, and wherein the second arm comprises a second side opening on the second portion that extends into the base; and
tracking an amount of the printing material that passes from the material cartridge into the trough while the control valve device is in the open configuration.

* * * * *